(12) United States Patent
Guarnera et al.

(10) Patent No.: US 7,199,825 B2
(45) Date of Patent: Apr. 3, 2007

(54) IMAGE GENERATING SYSTEM

(75) Inventors: Mirko Guarnera, Gela (IT); Massimo Mancuso, Monza (IT); Antonio Puliafito, Catania (IT); Antonio Arena, Vill. S. Agata (IT); Massimo Villari, Messina (IT)

(73) Assignee: STMicroelectronics S.r.l., Agrate (IT)

( * ) Notice: Subject to any disclaimer, the term of this patent is extended or adjusted under 35 U.S.C. 154(b) by 826 days.

(21) Appl. No.: 10/232,813

(22) Filed: Aug. 28, 2002

(65) Prior Publication Data

US 2003/0048369 A1 Mar. 13, 2003

(30) Foreign Application Priority Data

Aug. 29, 2001 (EP) .................................. 01830552

(51) Int. Cl.
*H04N 5/335* (2006.01)
(52) U.S. Cl. .................................. 348/272; 348/222.1
(58) Field of Classification Search ............. 348/222.1, 348/272, 336, 337, 338
See application file for complete search history.

(56) References Cited

U.S. PATENT DOCUMENTS 5,065,229 A 11/1991 Tsai et al. .................. 358/21 R
2003/0113013 A1* 6/2003 Hammadou .................. 382/166
2005/0146629 A1* 7/2005 Muresan ...................... 348/280
2006/0038891 A1* 2/2006 Okutomi et al. .......... 348/222.1

FOREIGN PATENT DOCUMENTS

WO     WO 00/18111     3/2000

OTHER PUBLICATIONS

European Search Report, EP 01830552, dated Jan. 15, 2002.

* cited by examiner

*Primary Examiner*—Tuan Ho
(74) *Attorney, Agent, or Firm*—Jenkens & Gilchrist, PC (57) ABSTRACT

A digital camera includes a sensor (205) for sensing an image and producing a first signal. A Bayer pattern producer (210) is coupled to the sensor and structured to produce a Bayer pattern from the first signal. The Bayer pattern is then split (212) into separate color channels. A color interpolator (214) is structured to perform a modification on only one of the color channels produced by the splitter (212). A compressor (220) then compresses the interpolated and non-interpolated color channels into a compressed image. An output interface (226) facilitates remote transmission of the compressed image over a communication channel. This communication may be made over a network to a server that operates in conjunction with the digital camera to perform certain functions, like image processing, manipulation, storage and communication, as directed by a user of the digital camera.

30 Claims, 7 Drawing Sheets

IMAGE GENERATING SYSTEM

CROSS-REFERENCE

This application claims priority from European Application for Patent Serial No. 01830552.4 filed Aug. 29, 2001, the disclosure of which is hereby incorporated by reference.

BACKGROUND OF THE INVENTION

1. Technical Field of the Invention

The present invention relates to an image generating system, and, more particularly, to a digital camera of the kind that produces a compressed image signal.

The digital camera utilizes a sensor for sensing an image and producing a first signal. A Bayer pattern producer is coupled to said sensor and operates to produce a Bayer pattern from said first signal. A splitter is provided to split said Bayer pattern into separate color channels. The color channels are then compressed into a compressed image which is output using an output interface on a communication channel.

2. Description of Related Art

Figure 1:
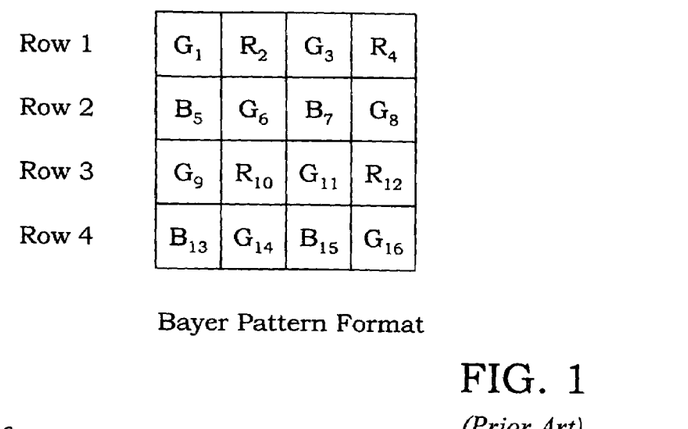
FIG. 1, previously described, is a diagram of a Bayer pattern mosaic layout used in digital cameras of the prior art.

Digital still cameras (DSC) generate a datafile that represents an image acquired by the camera. Generally, the DSC acquires the information from the light/color sensors in the camera in a camera filter array (CFA) format. A popular format for the CFA is a Bayer mosaic pattern layout, shown in FIG. 1. In a Bayer pattern, each pixel contains only one bit of color information, for instance, Red, Green or Blue. Typically, the Bayer pattern includes a green bit in every other space, and, in each row, either a blue or a red bit occupies the remaining space. For instance, as seen in FIG. 1, row one alternates between green and red bits, and row two alternates between green and blue. The end result is a mosaic made of red, green and blue points, where there are twice as many green points as red or blue.

A typical DSC is a stand-alone unit that includes all the circuitry and processes to create an image data file that represents an image. In addition to the sensors (typically charge coupled devices (CCDs) or CMOS circuits) that are used to create the Bayer pattern, DSCs include a mechanism to process the output from the CFA and turn it into a common data format, such as a JPEG (Joint Photographic Experts Group) file. These JPEG files can then be viewed with image programs, printed, stored, sent via email, etc. There are dozens of formats that can be used to store picture data, but the JPEG format is widely used because it creates a useable image with a small file size.

Figure 2:
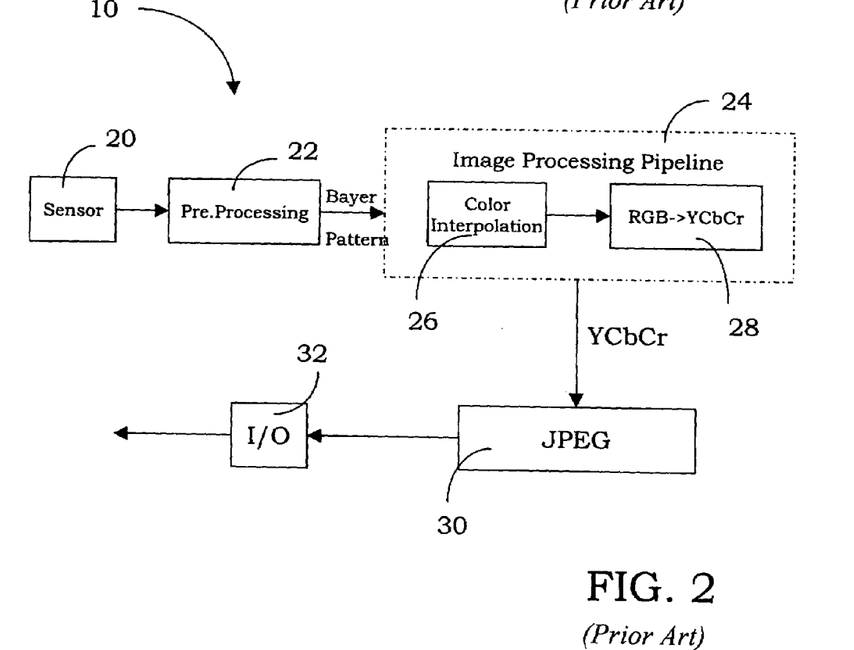
FIG. 2, previously described, is an example functional block diagram of a prior art digital camera.

FIG. 2 is an example functional block diagram of a prior art DSC. Included in the camera 10 is a sensor 20 that is used to originally acquire an image. A pre-processing block 22 includes all of the phases used for image pre-elaboration prior to obtaining the Bayer pattern. Generally it is activated prior to and during the image acquisition time. Functions within the pre-processing block 22 can include white-balance, auto-exposure, defect correction, auto-focus, etc. The output from the pre-processing block 22 is the Bayer pattern of the image.

The Bayer pattern is input into an image processing pipeline 24, which includes color interpolation functions 26 and an RGB converter 28. Those functions will be examined in detail with reference to FIG. 3. The output from the image processing pipeline 24 is sent to a JPEG compressor 30, which compresses the image modified by the image processing pipeline. A JPEG image is sent from the JPEG compressor 30 to a set of I/O devices 32, which are used to send the JPEG file from the DSC to another device, for instance a computer, a disk or CD drive, a printer, etc.

Figure 3:
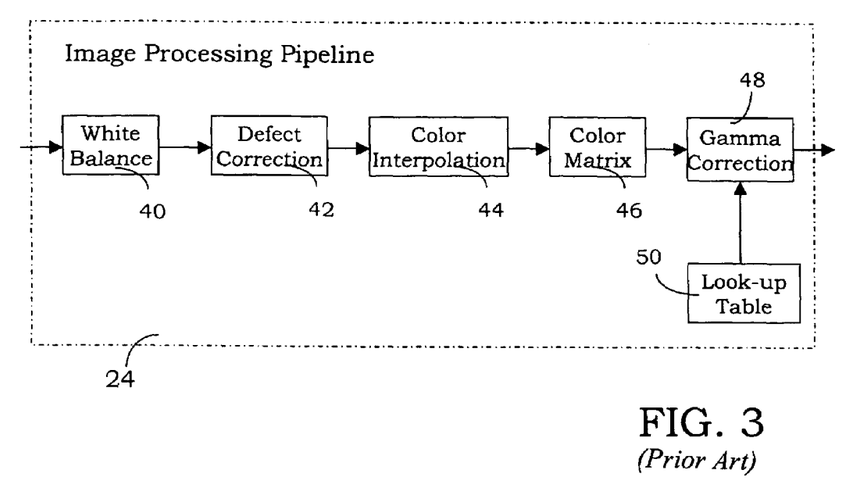
FIG. 3, previously described, is an example functional block diagram showing components that can be in the image processing pipeline of the digital camera of FIG. 2.

FIG. 3 is an example functional block diagram showing components that can be in the image processing pipeline 24. As stated above, the image processing pipeline 24 receives as input the Bayer pattern from the sensors. Although the Bayer pattern is the output from the sensors, this raw output from the sensors is not in a useable form, because there are too many defects, deviations, etc. in the output, and the Bayer pattern output must be modified prior to producing a useable image.

Some of the processes that can be performed on the Bayer pattern are a white balance process 40, aperture or other defect correction 42, a color interpolation 44, and a color matrix 46, which can include changing an RGB image from the Bayer pattern to one that separates chrominance and luminance. For example, a color conversion can be made using the following equations:

$Y=0.299(R)+0.587(G)+0.114(B)$ $Cb=0.5(R)-0.4187(G)-0.0813(B)+128$ $Cr=-0.1687(R)-0.3313(G)+0.5(B)+128$

Where Y is the luminance value, and Cr and Cb are the color (chrominance) values, in amounts of redness and blueness, respectively.

Additionally, the image processing pipeline 24 can include a gamma correction circuit 48, which can use a look up table 50.

The final image quality output from the DSC essentially depends on the number and quality of the processes contained in the image processing pipeline 24, and their accuracy and complexity. To produce an image with no or few artifacts and a very high image quality, the image processing pipeline 24 will be very complex, expensive and take a lot of time to process the Bayer pattern.

Figure 4:
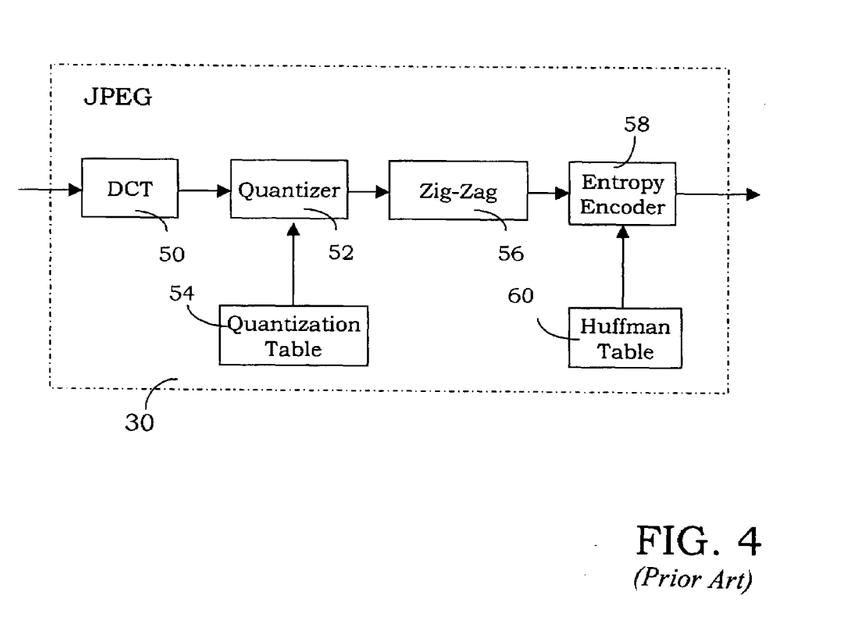
FIG. 4, previously described, is an example functional block diagram of a known JPEG compressor.

FIG. 4 is an example functional block diagram of the JPEG compressor 30. Similar to the image processing pipeline 24, the quality of the JPEG 30 will depend on the number, complexity and quality of the components contained within it. Typically found in a JPEG compressor 30 are a discrete cosine transform (DCT) circuit 50, which feeds its output to a quantizer 52. The quantizer uses a table 54 to produce a signal fed to a Zig-Zag circuit 56. The output of the Zig-Zag circuit 56 flows to an entropy encoder 58, which, by using a Huffman table 60, creates the JPEG image of the DSC.

As can be seen from the number of components and processes used to create a JPEG image from a DSC, it is difficult to create an accurate image with a DSC, in part because of the expense of the components involved, and the execution time of the large number of processes that must occur to create the JPEG image. Fewer components would save expense to the DSC, but would result in lower JPEG picture quality. Long execution times are not favored because a user of the DSC may wish to take several photographs in a short amount of time, which would be impossible if the image processing pipeline 24 took too long on each image.

Figure 5:
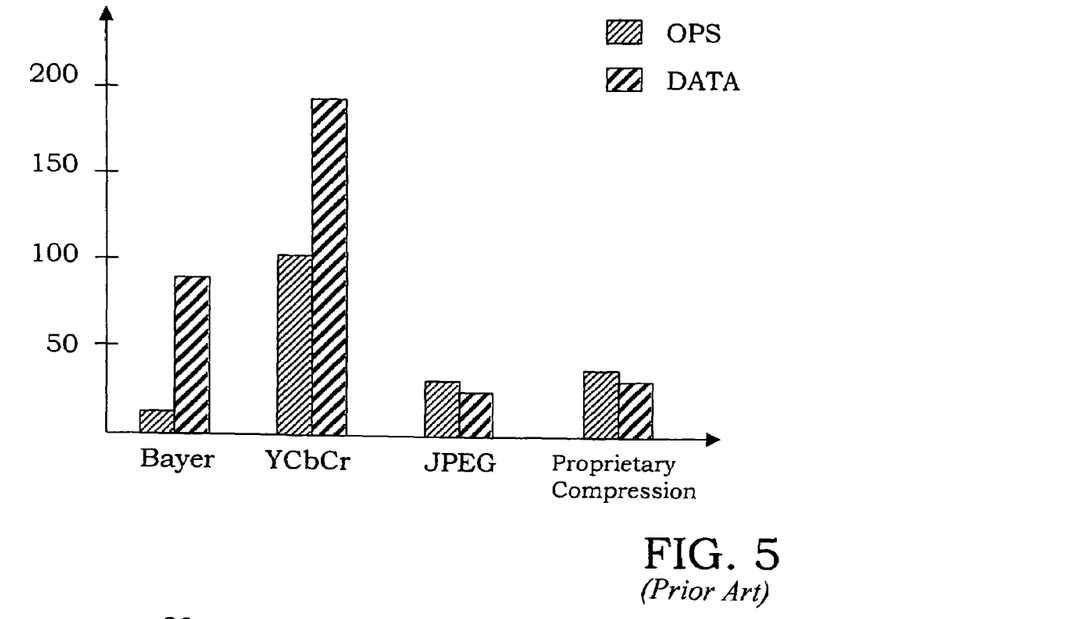
FIG. 5, previously described, is a graph showing the amount of data and operation necessary for different functions in an image processing pipeline of the prior art.

FIG. 5 is a graph showing relative example processing times for different functions in an image processing pipeline. While producing the Bayer pattern includes only a few operations and a moderate amount of data, the color interpolation requires a great amount of data and operations. At the end of the process the data are compressed according to the JPEG standard and transmitted according to the proprietary coding.

Figure 6:
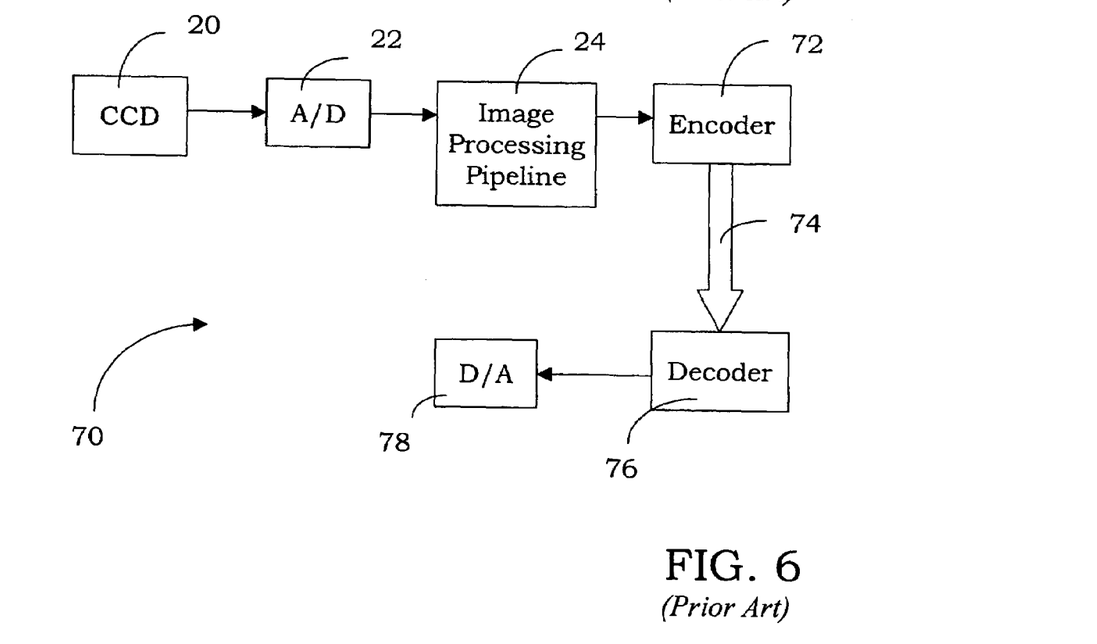
FIG. 6, previously described, is a block diagram of a transmission system of data from a digital camera over a communication network according to the prior art.

FIG. 6 shows a typical system 70 where an image is created in a DSC and then transmitted to another device. That FIGURE shows components that were seen in previous FIGURES, for example, the CCD generating an analog signal that is converted to a digital one prior to entering the image processing pipeline 24. Additionally, an encoder 72 prepares the data for transmission along a data channel 74. The data channel can be any transmission means, for example wired (Serial, LAN, USB), or wireless (IR, Bluetooth, cellular), and the like. On the other side of the data channel 74 is a decoder 76 and a digital to analog processor 78, which is used to create a useable image product from the transmitted data.

Conventional DSCs use a conventional color interpolation process to extend data from the CFA format to three color planes. After the color image generation, compression is performed to reduce the color plane data. As described above, the image processing pipeline in a DSC carries out heavy calculations that must be performed for a great amount of data.

Figure 7:
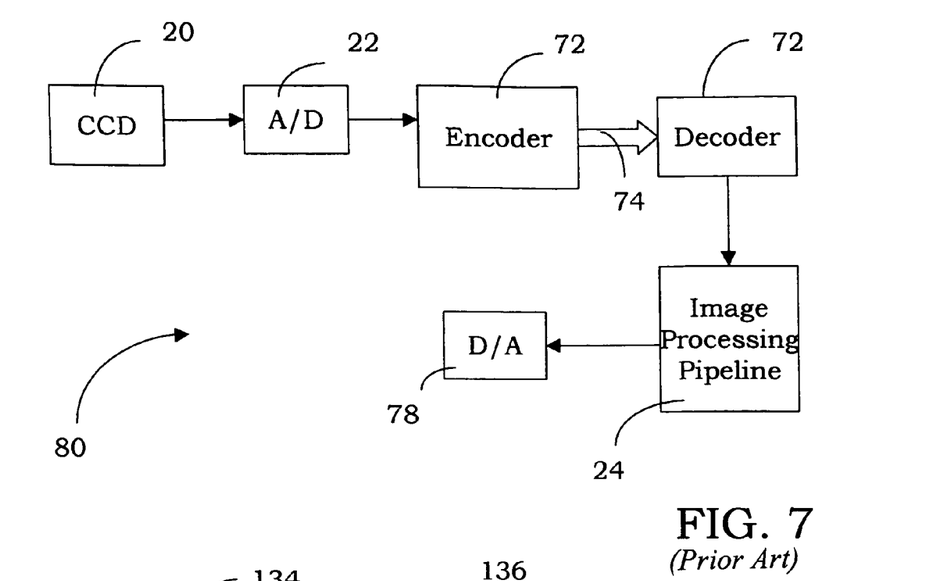
FIG. 7, previously described, is a block diagram of a transmission system of data from a digital camera over a communication network according to the prior art.

FIG. 7 shows a transmission system 80 similar to the system 70 of FIG. 6. The transmission system 80 performs the color processing after sending the data over the data channel 74. In this system, the encoder 72 (which is generally some type of compression system) compresses the raw CFA format data prior to splitting it into separate color planes, etc. After the receiver receives and decompresses this data, it performs all of the steps described above that are usually performed by the DSC (white balance, gamma correction, etc.). This type of system 80 prevents the paradox in typical DSC systems, such as the one shown in FIG. 6, which is that after the color processing expands the amount of data received from the Bayer pattern, the compression algorithms (especially in lossy type systems such as JPEG) throw away some of that expanded data.

Few solutions use the method of the transmission system 80. One of the problems is in the way the source data is compressed. In a transmission system 80, if the data from the CFA or the Bayer pattern is immediately compressed with JPEG compression (in order to send it over the data channel 74) there is a problem with some of the parameters. Specifically, in the DTC process, there is a distortion of the DTC coefficient if this procedure is used. This prevents widespread use of the transmission system 80 because a quality image could not be produced on the receiving side of the channel due to the distortion.

Current DSC systems cannot take advantage of using a distributed approach to create images and other services. Generally, current DSCs are instead stand-alone devices that generate adequate image files, which can then be transmitted over a separate network.

SUMMARY OF THE INVENTION

The solution to the above-stated problem is that of using a distributed system of a less complex but still capable DSC as a data gathering device connected to a network. Complexity of current DSCs can be reduced, along with the power requirements thereof. A novel encoding of the Bayer pattern data enables an image to be recreated on a network device even after compressing and decompressing using a lossy system.

The digital camera utilizes a sensor for sensing an image and producing a first signal. A Bayer pattern producer is coupled to said sensor and operates to produce a Bayer pattern from said first signal. A splitter is provided to split said Bayer pattern into separate color channels. The color channels are then compressed into a compressed image which is output using an output interface on a communication channel. Prior to compression, however, only one of the color channels is interpolated.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Transmitting an image over a communication network or storing an image to a data storage device generally requires data compression, because non-compressed image data files are too large to be transmitted or easily stored. A large amount of data is processed and a large number of operations are required to perform the compression.

Embodiments of the invention avoid these data processing operations to a degree by exploiting the resources offered by the next generation of communication systems and by using a distributed system. Benefits include a reduction in the time spent for the data processing, less costly design, development, production and cost of data gathering devices (for example, DSCs), and reduced power consumption. This system can also easily be used in a multimedia environment adding, for example, audio and text to the already known features of a DSC.

In order to generate a colored image from a mobile terminal (such as a DSC or other digital image gathering device), the data image must be transmitted from the mobile terminal in an adequate format. This reduces the amount of calculation on the mobile terminal and can add to the terminal other multimedia capabilities.

Figure 8:
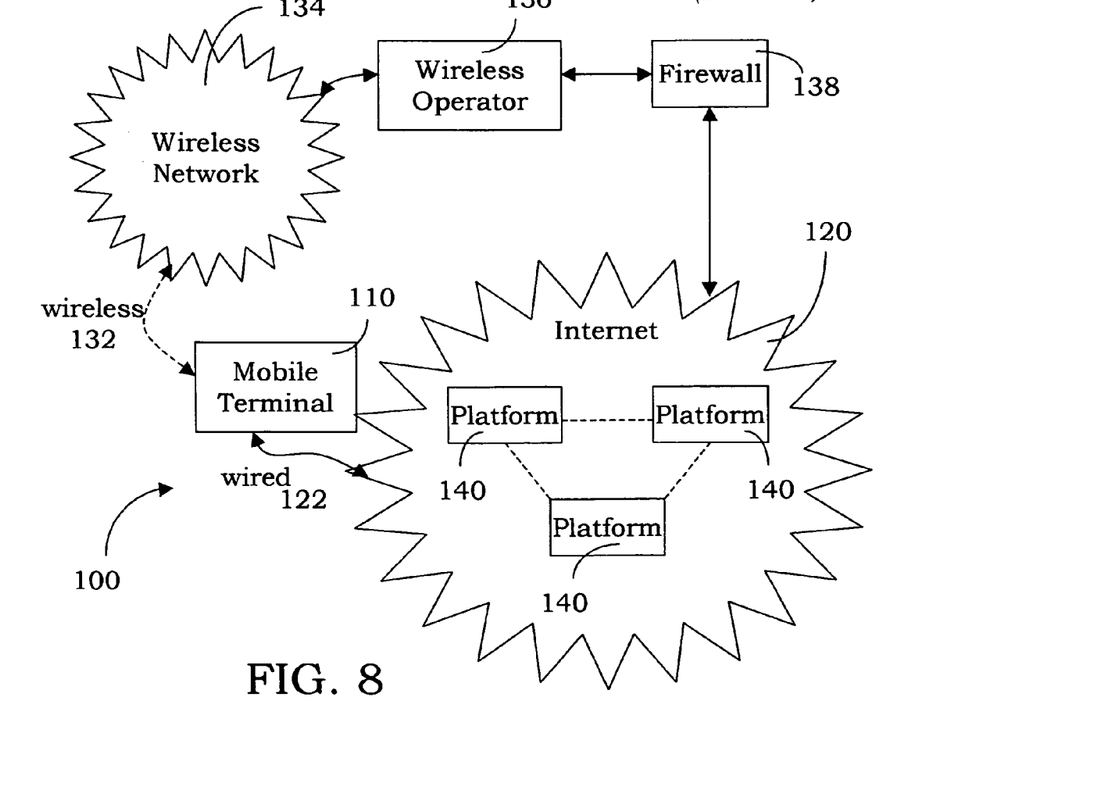
FIG. 8 is a block diagram showing a network system including a mobile device according to an embodiment of the invention.

A connection between a mobile terminal and a network containing platforms in which services reside can be either wired or wireless. FIG. 8 is a block diagram showing a network system 100. In the system 100 are a mobile terminal 110, which can be, for instance, a DSC. The mobile terminal 110 can connect to a communication network 120, for example the Internet, either directly via a wired connection 122 or a wireless connection 132. The wireless connection 132 communicates over a wireless network 134, (for example, Universal Mobile Telecommunications Service (UMTS) or General Packet Radio Service (GRPS)) to a wireless operator 136. The wireless operator 136 is coupled to the Internet 120 through a firewall 138.

In this network system 100 there are several platforms 140 for running distributed applications. In each platform 140, several services are available.

Figure 9:
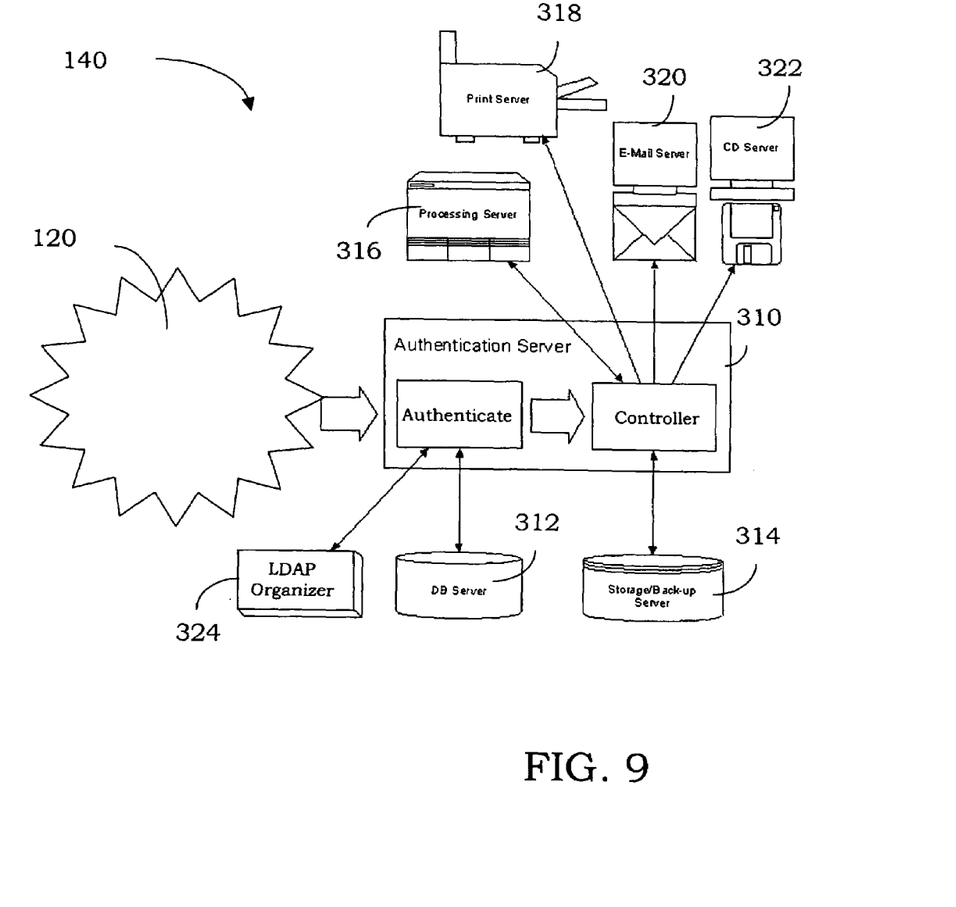
FIG. 9 is a block diagram that shows example services that can be provided on a platform in the network system of FIG. 9.

FIG. 9 shows example services that can be provided on each platform 140. Of course, fewer or additional services can be present on each platform 140. Services illustrated in FIG. 11 include an authentication server 310, a data repository 312, such as a database, storage and back-up services 314, a processing server 316, a print server 318, an email server 320, and a CD server 322. Each of these services or servers coordinates to other machines or processes to perform the tasks. For example, the email server 320 would be coupled to an email program to deliver the data via email; the CD server 322 would have machines coupled to it that could store the data on Compact Disks, etc.

The authentication server 310 is used to authenticate incoming images that it receives from the communication network 120. Presumably the data that the authentication server 310 receives over the communication network 120 will be images sent from the mobile terminal 110, but the authentication server 310 ensures that the images are from a properly authorized device. One method of doing this could be through the incorporated data signature added to the data during a security step of the mobile terminal, discussed below.

Once the incoming data is properly checked, it is associated with a user code that identifies which mobile terminal 110 sent the data. Associated with each user is a list of services available to the user, which are stored in the storage services 314. The storage services 314 are optimized for searching due to the redundant localization of the user's data per geographical area. Each user may be able to access different services depending on the services desired.

Along with the image data sent by the user will be a command or set of commands. For instance, the user can request manipulation of the image data, such as filtering, cropping, increasing sharpness, etc., or could request commands to send the image data by email, print it, or store it on CD. The authentication server 310 will first check to see that the user is authorized to use the list of commands sent. Once authorized, the authentication server 310 routes the image data to the proper storage/back-up services manager 314 for storage, where it can later be retrieved and other services performed.

The authentication server can be implemented, for instance, using the Lightweight Directory Access Protocol (LDAP) running on an organizer 324 to communicate with the other relevant devices in the platform 140.

Returning back to the mobile terminal 110, embodiments of the invention include a DSC that is specially designed to work with the network 100.

Figure 10:
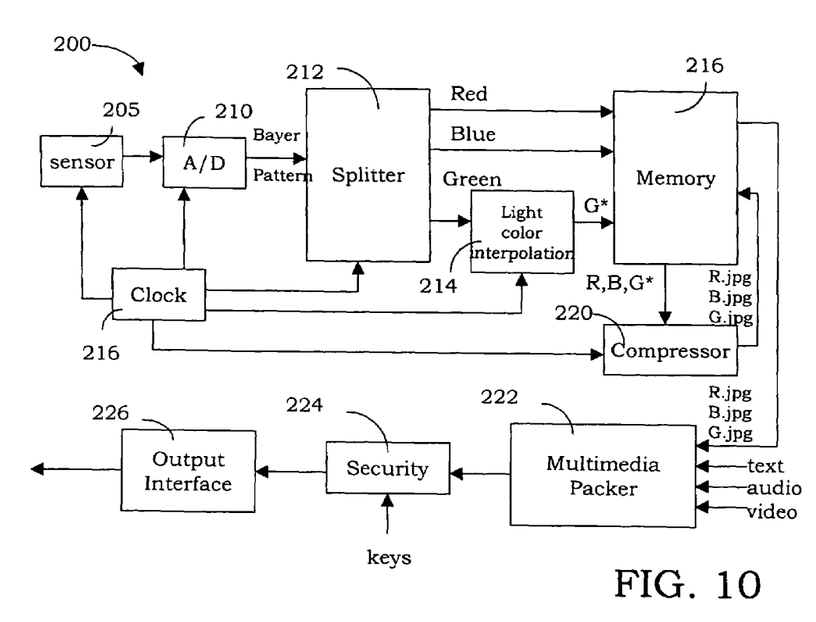
FIG. 10 is a block diagram of a DSC that can be used in conjunction with the network shown in FIG. 9.

FIG. 10 is a block diagram of a DSC 200 that can be used in conjunction with the network 100. In the DSC 200, to avoid distortions due to the subsampling of the CFA format, a light color interpolation is performed only for the G channel, and not for the R and B channels. Thus, from a N×M Bayer pattern image, two images are obtained that are sized N/2×M/2 and one image is obtained that is sized N×M.

Color interpolation performed on the G channel can be made in the following manner. With reference to the Bayer pattern of FIG. 1, a green value can be calculated for a pixel that does not store green values (for example the pixels that store red or blue values) by averaging the green values in pixels adjacent to the desired value. For example, the green value in the 7th pixel can be determined by:

$$G_7 = \frac{G_3 + G_6 + G_8 + G_{11}}{4}$$

Other formulas for determining a pixel value, for example by including more pixel adjacent values than in the formula above, and weighting the nearer pixel values more than the ones far away can be performed as well.

These calculations can be made and the result stored in the DSC 200 of FIG. 10. In the DSC 200, a sensor 205, such as a CCD or CMOS circuit sends its output to an analog to digital converter 210. The output of the analog to digital converter 210 is the Bayer pattern discussed above. The Bayer pattern is fed to a splitter 212, which separates the red, green and blue pixel data stored in the Bayer pattern. The green data that is split from the Bayer pattern by the splitter 212 undergoes the light color interpolation as discussed above in an interpolator 214. The red and blue data are not interpolated as such.

A clock circuit 216 provides a clock signal to each of the sensor 205, A/D converter 210, splitter 212 and interpolator 214.

The red and blue data from the splitter 212, and the interpolated green data that is the output of the interpolator 214 are sent to a memory 216, which can be any standard memory device. Preferably, the memory 216 is made of SDRAM. The memory 216 is coupled to a compressor 220, such as a JPEG compressor. The compressor 220 compresses the raw uninterpolated source image data from the red and blue channels, and the light color interpolated source image data from the interpolator 214, and stores the result (as R.jpg, B.jpg, and G.jpg) back in the memory 216. Because this compression occurs early when compared to all of the data manipulations of the camera 10 of the prior art in FIG. 2, there are no visible errors when comparing the original image to the one that is formed when the image compressed by the compressor 220 is later decompressed.

The compressed data from the memory 216 is routed to a multimedia packer 222. In this device other data can be added to the coded image data, for instance, text, video, audio, etc. This other multimedia data can be in a proprietary format, or a standard format, such as MIME, etc.

Once the additional multimedia information has been added, if desired, by the packer 222, the output is provided to a security block 224. The security block 224 accepts as input public and private keys, which can be used to encrypt the data for transmitting over a public communication network. Encryption using public and private keys provides very strong protection against unauthorized access, and ensures that the data cannot be de-encrypted by anyone other than an authorized user.

The security block 224 may include a smart-card slot, standard in the industry, that stores the keys with the encryption codes on them. The security block 224 could read the keys from the smart card, then use the information to package all of the data to be sent from the DSC 200. That way, users will not have to remember any passwords, numerical keys, or other easy to forget information.

An output interface block 226 includes all of the circuitry necessary to transmit the data output from the DSC 200 onto either the wired or wireless transmission channel, discussed above.

Figure 11:
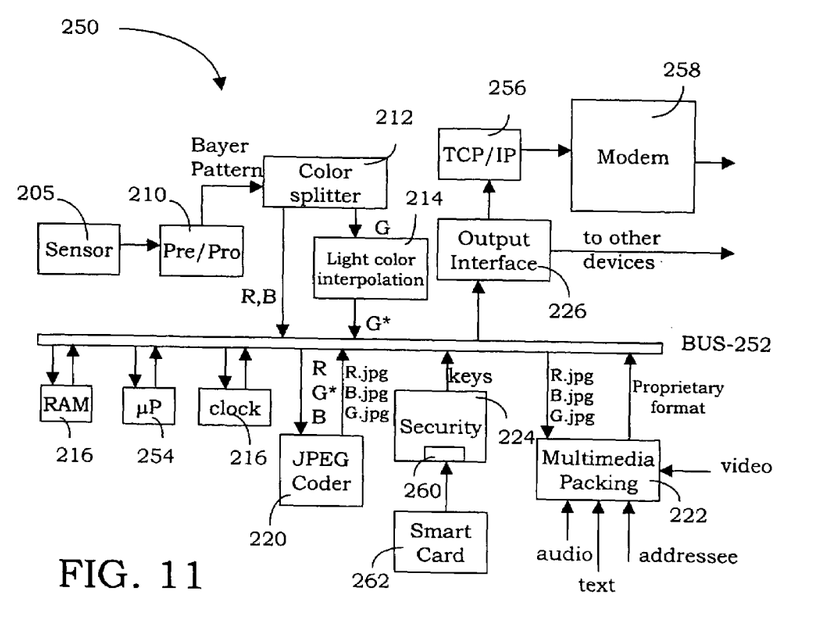
FIG. 11 is an example embodiment of the DSC of FIG. 10.

An example embodiment of the DSC 200 implementing the functional block diagram of FIG. 10 is shown in FIG. 11. Circuitry that has an identical function with the block diagram of FIG. 10 is numbered the same as in that FIGURE. Central to a DSC 250 embodied as the circuit shown in FIG. 11 is a bus 252. Most of the circuits connect directly to the bus 252, or though an intermediary circuit.

Output from the sensor 205 proceeds to the processing block 210, which can include the A/D converter. That output, which is the Bayer pattern is sent to the color splitter as described above. The Red and Blue channels are sent directly from the color splitter 212 to the bus 252, while the green channel is interpolated, as described above, by the light color interface 214.

The clock 216, JPEG coder 220, security block 224, multimedia packer 222 and the output interface block 226 couple directly to the bus 252 to transmit signals between these devices. Additionally, a microprocessor 254, which can be any type of adequate processor is connected to the bus 252 as well. The microprocessor executes the commands necessary to perform the steps in the DSC 250, from acquiring the image from the sensor 205 to sending the data output from the DSC.

Data is sent from the DSC 250 from the output interface block 226, which is also coupled directly to the bus 252. The output interface block 226 coordinates with a TCP/IP encoder 256 to break the data from the interface into packets so that they can be sent over a communication network. The actual sending of the data from the DSC 250 is via a modem (or set of modems), generally indicated in a modem circuit 258. That block includes the circuitry necessary to send the data from the DSC over the wired or wireless networks as described above.

In some embodiments of the DSC 250, the security block 224 includes a smart card socket 260 capable of accepting a security smart card 260. As described above, the smart card 262 stores codes and/or processes that are used by the DSC 250 to package the data sent from the DSC such that only authorized users can access the data.

In operation, when the sensor 205 of the DSC 250 acquires a scene, it is scanned and the resulting pixels are preprocessed by the Pre-Pro block 210, which includes the A/D converter. The pixels are then split by the splitter 212 to create three different images, one for each sub-sampled color channel. Color interpolation is performed for the green image by the color interpolator 214, thus image quality is improved. At this point the R, G*, and B images are present and stored in the memory 216. These three images are compressed with the coder 220, with an adequate bit/pixel ratio, in order to maintain both high quality and a compression factor that is as high as possible.

Other multimedia data can be added to these compressed images from other sources, such as microphones, keyboards, etc. in the multimedia packing block 222. All of this information is formatted in a proprietary format by the packer 222 and then coded with the appropriate keys, which can be asymmetric or symmetric, loaded from the smart card 262.

The data can then be transmitted by the modem block 258 over a wired channel protocol, such as Ethernet, or a wireless channel protocol, such as GPRS.

The DSC 250 can be very inexpensive to design, test, and produce because much less image-processing takes place on the DSC 250 than compared to the prior art DSCs. Moreover, the power consumption of the DSC 250 is very low, which extends the life of the portable power supply, which are typically batteries.

To test the results of a system where light color interpolation is not performed on the green channel to one, as in the DSC 250 where the interpolation is performed, a simulation has been performed. The tests performed were parameterized by the Gain factor of the compressor (the factor to multiplied to the Quantizer table). This factor strongly influences the accuracy of the output image.

Figure 12A:
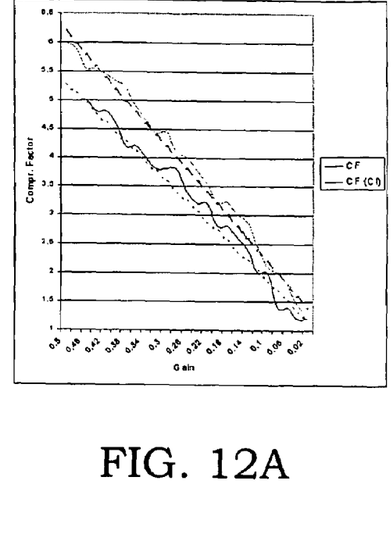
FIG. 12A is a graph showing relations between Gain and the Compressor Factor in two cases, with and without a block 214.
Figure 12B:
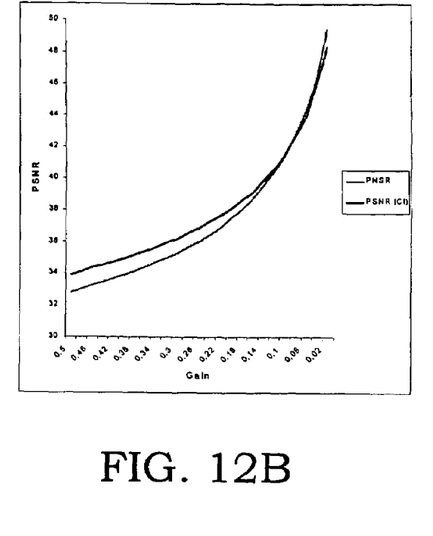
FIG. 12B is a graph comparing PSNR (for test set of images) in the case of splitting with G plane interpolation (CI) block 214 and in the case without the block 214.

FIG. 12A is a graph comparing the PSNR (Peak Signal to Noise Ratio) in function of the Gain and FIG. 12B second shows the relations between Gain and the Compressor Factor (CF).

Thus there is a tradeoff between accuracy (PSNR) and compression.

With reference to the FIG. 12B, it should be noted that if the PSNR is selected to be over 35, it is difficult to find differences between the image processed with the traditional process and one processed as would be by the DSC 250.

Figure 13A:
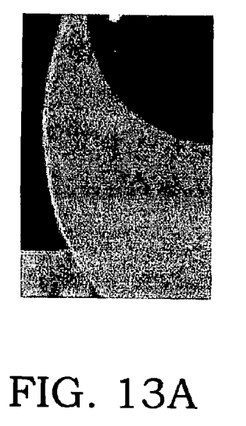
FIGS. 13A, 13B and 13C are images having varying amounts of processing performed on them.
Figure 13B:
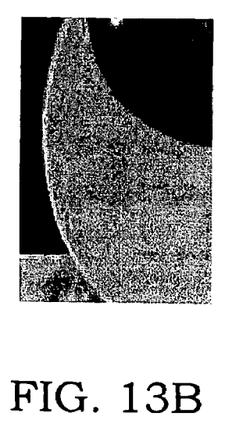
Figure 13C:
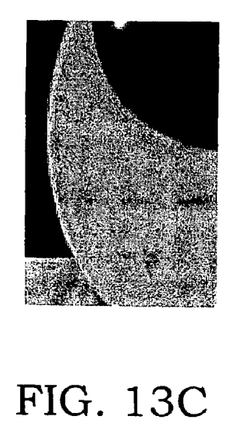

FIGS. 13A, 13B, and 13C show an example of test images. FIG. 13A shows a reference image from a system using a camera of the prior art, where the image data from the sensor of the camera was modified by an image processing pipeline within the camera itself, and thus is the reference image. FIG. 13B is an image where the Bayer pattern data from a camera was compressed, and further image processing took place after the image was uncompressed. The errors in the DCT processing cause the final picture to be blurry and contain artifacts. The image in FIG. 13C underwent color interpolation on the Green channel, as described above, prior to compressing the image. After the image was uncompressed, further image processing took place. Note that this process produces an overall image very similar to the reference image of FIG. 13A, but with a much less costly DSC.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A digital camera, comprising:
   a sensor for sensing an image and producing a first signal;
   a Bayer pattern producer coupled to said sensor and structured to produce a Bayer pattern from said first signal;
   a splitter structured to split said Bayer pattern into at least first and second separate color channels;

a color interpolator structured to perform an interpolation modification on only the first separate color channel output from said splitter;

a compressor for compressing said interpolation modified first color channel along with compressing the non-interpolation modified second color channel into a compressed image;

an output interface structured to transmit said compressed image on a communication channel.

2. The digital camera according to claim 1, wherein the interpolation modification performed on only on the first of said color channels is a color interpolation of a green channel of said Bayer pattern.

3. The digital camera according to claim 1, wherein said output interface is structured to couple to a wireless network.

4. A comprising:
a sensor for sensing an image and producing a first signal;
a Bayer pattern producer coupled to said sensor and structured to produce a Bayer pattern from said first signal;
a splitter structured to split said Bayer pattern into separate color channels;
a compressor for compressing said color channels into a compressed image;
an output interface structured to transmit said compressed image on a communication channel;
a color interpolator structured to perform a modification on exactly one of said color channels output from said splitter prior to sending said color channels to said compressor; and
a multimedia packager structured to add multimedia data to said compressed image prior to sending the compressed multimedia data to said output interface.

5. The digital camera according to claim 4, wherein said multimedia data is packed in a proprietary format prior to sending it to said output interface.

6. A digital camera, comprising:
a sensor for sensing an image and producing a first signal;
a Bayer pattern producer coupled to said sensor and structured to produce a Bayer pattern from said first signal;
a splitter structured to split said Bayer pattern into separate color channels;
a compressor for compressing said color channels into a compressed image;
an output interface structured to transmit said compressed image on a communication channel;
a color interpolator structured to perform a modification on exactly one of said color channels output from said splitter prior to sending said color channels to said compressor; and
a security circuit structured to read a key from an external device and encrypt the compressed data.

7. The digital camera according to claim 6, wherein said external device is a smart card.

8. A method for creating an intermediate digital image file, comprising the steps of:
taking a digital image and producing data;
producing a pattern from the taken digital image data;
separating the pattern into a plurality of color channels;
interpolating only one of the color channels to produce an interpolated color channel; and
compressing the interpolated color channel and the non-interpolated color channel(s) into an intermediate digital image file.

9. The method as in claim 8 further including the step of storing the intermediate digital image file.

10. The method as in claim 8 further including the step of communicating the intermediate digital image file.

11. The method as in claim 10 wherein the step of communicating comprises a selected one of wired and wirelessly communicating the intermediate digital image file.

12. The method as in claim 8 further including the steps of:
transferring the intermediate digital image file; and
after transfer, then:
decompressing the intermediate digital image file to recover the interpolated color channel and the non-interpolated color channel(s); and
further processing the recovered interpolated color channel and the non-interpolated color channel(s) to produce a final digital image file.

13. The method as in claim 12 wherein the step of transferring comprises the step of storing the intermediate digital image file.

14. The method as in claim 12 wherein the step of transferring comprises the step of communicating the intermediate digital image file.

15. The method as in claim 12 wherein the step of further processing comprises the step of manipulating image data.

16. The method as in claim 15 wherein the step of manipulating comprises the step of performing an image manipulation operation taken from the group consisting of filtering, cropping, and increasing sharpness.

17. The method as in claim 15 wherein the step of manipulating comprises the step of performing an image manipulation operation taken from the group consisting of printing an image, saving an image, and electronically communicating an image.

18. A method for creating an intermediate digital image file, comprising the steps of:
taking a digital image and producing data;
producing a pattern from the taken digital image data;
separating the pattern into a plurality of color channels;
interpolating only one of the color channels to produce an interpolated color channel; and
compressing the interpolated color channel and the non-interpolated color channel(s) into an intermediate digital image file; and
further including the step of adding multimedia content to the interpolated color channel and the non-interpolated color channel(s) when forming the intermediate digital image file.

19. The method as in claim 18 wherein the multimedia content comprises data obtained from a multimedia source.

20. The method as in claim 18 wherein the multimedia source is a source taken from the group consisting of a microphone, a text entry device and a music device.

21. An image acquisition device, comprising:
a digital imager producing an output signal;
a pattern generator that outputs a pattern from the output signal;
a splitter that splits that pattern into at least a first color channel data and a second color channel data;
an interpolator that interpolates only the first color channel data;
a compressor that compresses the second color channel data and the interpolated first color channel data into a compressed data file; and
a memory that stores the compressed data file.

22. The device as in claim 21 wherein the digital imager is a CCD.

23. The device as in claim 21 further including an input/output port for remotely communicating the compressed data file from the device for further processing.

24. The device as in claim 21 wherein the compressor is a JPEG coder.

25. The device as in claim 21 further including an encryption facility for encrypting the compressed data file.

26. The device as in claim 21 wherein the pattern generator is a Bayer pattern generator.

27. An image acquisition device, comprising:
a digital imager producing an output signal;
a pattern generator that Outputs a pattern from the output signal;
a splitter that splits that pattern into at least a first color channel data and a second color channel data;
an interpolator that interpolates only the first color channel data;
a compressor that compresses the second color channel data and the interpolated first color channel data into a compressed data file;
a memory that stores the compressed data file; and
a multimedia add-on facility for adding multimedia content to the compressed data file.

28. The device as in claim 27 wherein the multimedia content comprises data obtained from a multimedia source.

29. The device as in claim 28 wherein the multimedia source is a source taken from the group consisting of a microphone, a text entry device and a music device.

30. The device as in claim 28 wherein the data comprising the multimedia content comprises multimedia data taken from the group consisting of text entry, voice entry and music entry.

* * * * *

UNITED STATES PATENT AND TRADEMARK OFFICE
CERTIFICATE OF CORRECTION

| | | |
|---|---|---|
| PATENT NO. | : 7,199,825 B2 | Page 1 of 1 |
| APPLICATION NO. | : 10/232813 | |
| DATED | : April 3, 2007 | |
| INVENTOR(S) | : Mirko Guarnera et al. | |

It is certified that error appears in the above-identified patent and that said Letters Patent is hereby corrected as shown below:

At column 9, claim number 4, line number 16, please replace [A comprising:] with the phrase -- A digital camera, comprising: --.

At column 11, claim number 27, line number 12, please replace the word [Outputs] with the word -- outputs --.

Signed and Sealed this
Eighteenth Day of October, 2011

David J. Kappos
*Director of the United States Patent and Trademark Office*